US012321775B2

(12) United States Patent
Malalangaradass

(10) Patent No.: US 12,321,775 B2
(45) Date of Patent: Jun. 3, 2025

(54) INTERRUPT HANDLING BY MIGRATING INTERRUPTS BETWEEN PROCESSING CORES

(71) Applicant: Intel Corporation, Santa Clara, CA (US)

(72) Inventor: Sampath Malalangaradass, Bangalore (IN)

(73) Assignee: Altera Corporation, San Jose, CA (US)

(*) Notice: Subject to any disclaimer, the term of this patent is extended or adjusted under 35 U.S.C. 154(b) by 665 days.

(21) Appl. No.: 17/481,069

(22) Filed: Sep. 21, 2021

(65) Prior Publication Data

US 2023/0100059 A1    Mar. 30, 2023

(51) Int. Cl.
G06F 9/48 (2006.01)
G06F 13/24 (2006.01)

(52) U.S. Cl.
CPC ............ *G06F 9/4812* (2013.01); *G06F 13/24* (2013.01)

(58) Field of Classification Search
CPC ............................... G06F 9/4812; G06F 13/24
See application file for complete search history.

(56) References Cited

U.S. PATENT DOCUMENTS

| 7,962,679 | B2* | 6/2011 | van de Ven | G06F 1/3203 710/266 |
| 10,481,946 | B2* | 11/2019 | Sato | G06F 9/4837 |
| 2005/0125582 | A1 | 9/2005 | Tu | |
| 2009/0248934 | A1 | 1/2009 | Ge | |
| 2011/0087815 | A1* | 4/2011 | Kruglick | G06F 13/24 710/260 |
| 2011/0271142 | A1* | 11/2011 | Zimmer | G06F 9/4405 714/10 |
| 2013/0054860 | A1* | 2/2013 | Tsirkin | G06F 13/24 710/266 |
| 2013/0179616 | A1* | 7/2013 | Accapadi | G06F 9/5033 710/269 |
| 2014/0047149 | A1* | 2/2014 | Marietta | G06F 9/45533 710/264 |

(Continued)

FOREIGN PATENT DOCUMENTS

| EP | 2330506 A1 | 8/2011 |
| EP | 2885707 B1 | 1/2020 |

OTHER PUBLICATIONS

Extended European Search Report for EP Application No. EP22189693, dated Feb. 15, 2023.

*Primary Examiner* — Henry Tsai
*Assistant Examiner* — Aurangzeb Hassan
(74) *Attorney, Agent, or Firm* — Fletcher Yoder, P.C.

(57) ABSTRACT

Systems or methods of the present disclosure may provide for interrupt migration using a processor and/or system on a chip. The system includes multiple processing cores and an interrupt controller. The interrupt controller includes an input terminal configured to receive an interrupt request and an interrupt controller timer. The interrupt controller also includes an output terminal configured to output an interrupt based on the interrupt request. Furthermore, the interrupt controller includes an interface configuration and status circuitry configured to track a period of time that the interrupt is transmitted to a first processing core of the multiple processing cores.

19 Claims, 13 Drawing Sheets

(56) References Cited

U.S. PATENT DOCUMENTS

| | | | | |
|---|---|---|---|---|
| 2014/0082240 A1* | 3/2014 | Coleman | ............ | G06F 9/45558 |
| | | | | 710/260 |
| 2014/0365697 A1* | 12/2014 | Toyama | ................ | G06F 13/24 |
| | | | | 710/262 |
| 2016/0139655 A1* | 5/2016 | Chen | ...................... | G06F 1/324 |
| | | | | 713/324 |
| 2016/0196141 A1* | 7/2016 | Deshpande | ........... | G06F 9/4856 |
| | | | | 712/244 |
| 2017/0177338 A1* | 6/2017 | Gschwind | ............ | G06F 9/4812 |
| 2017/0364137 A1* | 12/2017 | Gendler | ................ | G06F 13/24 |
| 2018/0165120 A1* | 6/2018 | Prosch | ................... | G06F 9/505 |

* cited by examiner

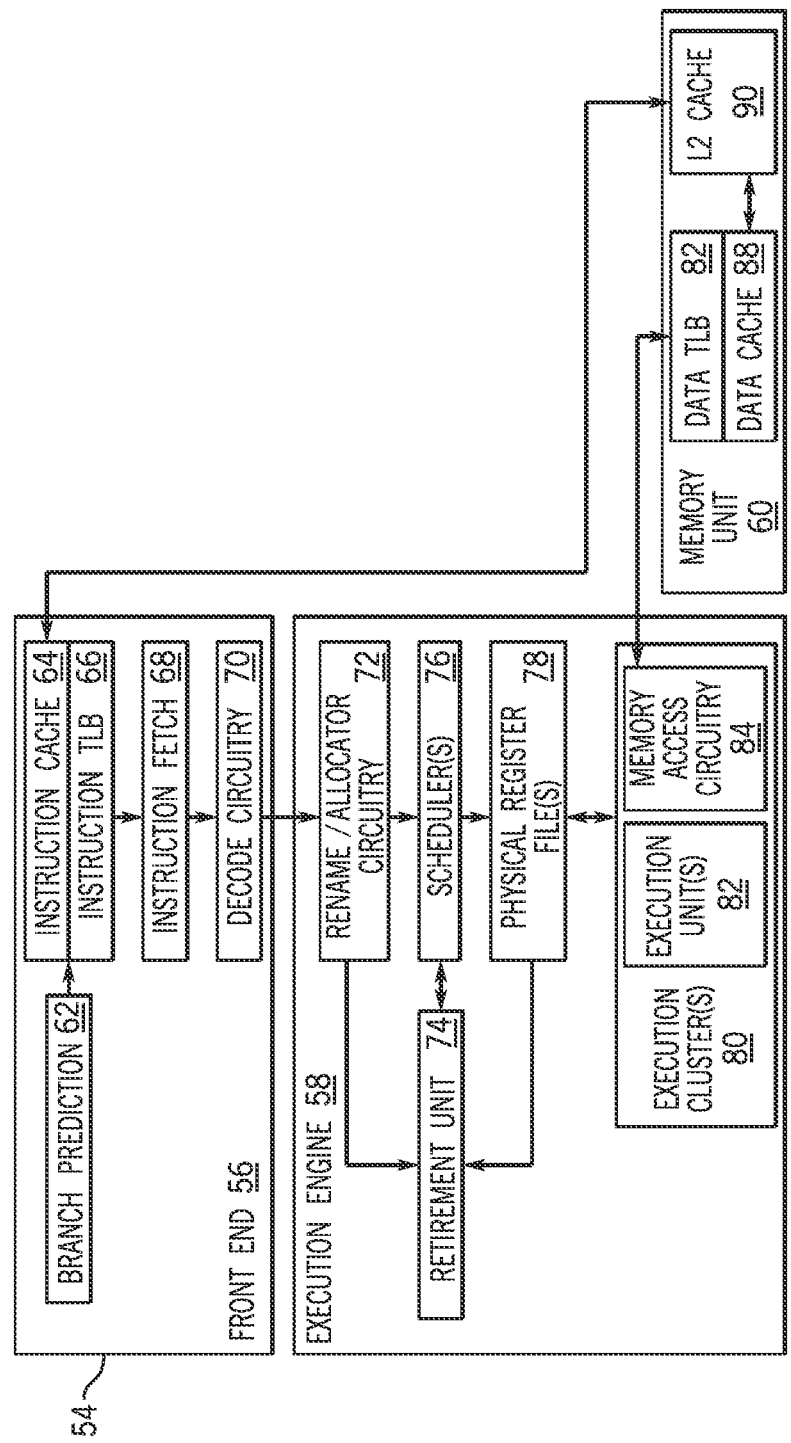

INTERRUPT HANDLING BY MIGRATING INTERRUPTS BETWEEN PROCESSING CORES

BACKGROUND

The present disclosure relates generally to interrupts for processors (e.g., systems-on-chips (SoCs)). More particularly, the present disclosure relates to migrating interrupts between processing cores.

Interrupt signals may typically be sent from an interrupt controller to processing cores for servicing a corresponding interrupt. These interrupt schemes may have a static view of interrupt affinity and priority configuration based on previous experience. However, settling these static interrupt affinities and priority configurations often takes time. Tweaking of the interrupt affinities and priority configurations before and after launch of a central processing unit and/or system on a chip takes time and is not achievable with ease. Such delays in updating the interrupt affinities and priority configurations may cause a high priority interrupt to wait too long before being serviced by a core of a system possibly causing a critical use case to fail. These failures may be particular problematic in real-time devices, such as medical devices, modem devices, and/or Internet of things (IOTG) devices.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

BRIEF DESCRIPTION OF THE DRAWINGS

Various aspects of this disclosure may be better understood upon reading the following detailed description and upon reference to the drawings in which:

FIG. 2A is a block diagram illustrating an in-order pipeline and a register renaming, out-of-order issue/execution pipeline, in accordance with an embodiment of the present disclosure;

FIG. 2B is a block diagram illustrating an in-order architecture core and a register renaming, out-of-order issue/execution architecture core to be included in a processor, in accordance with an embodiment of the present disclosure;

DETAILED DESCRIPTION OF THE EMBODIMENTS

One or more specific embodiments will be described below. To provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Register Architecture

Figure 1:
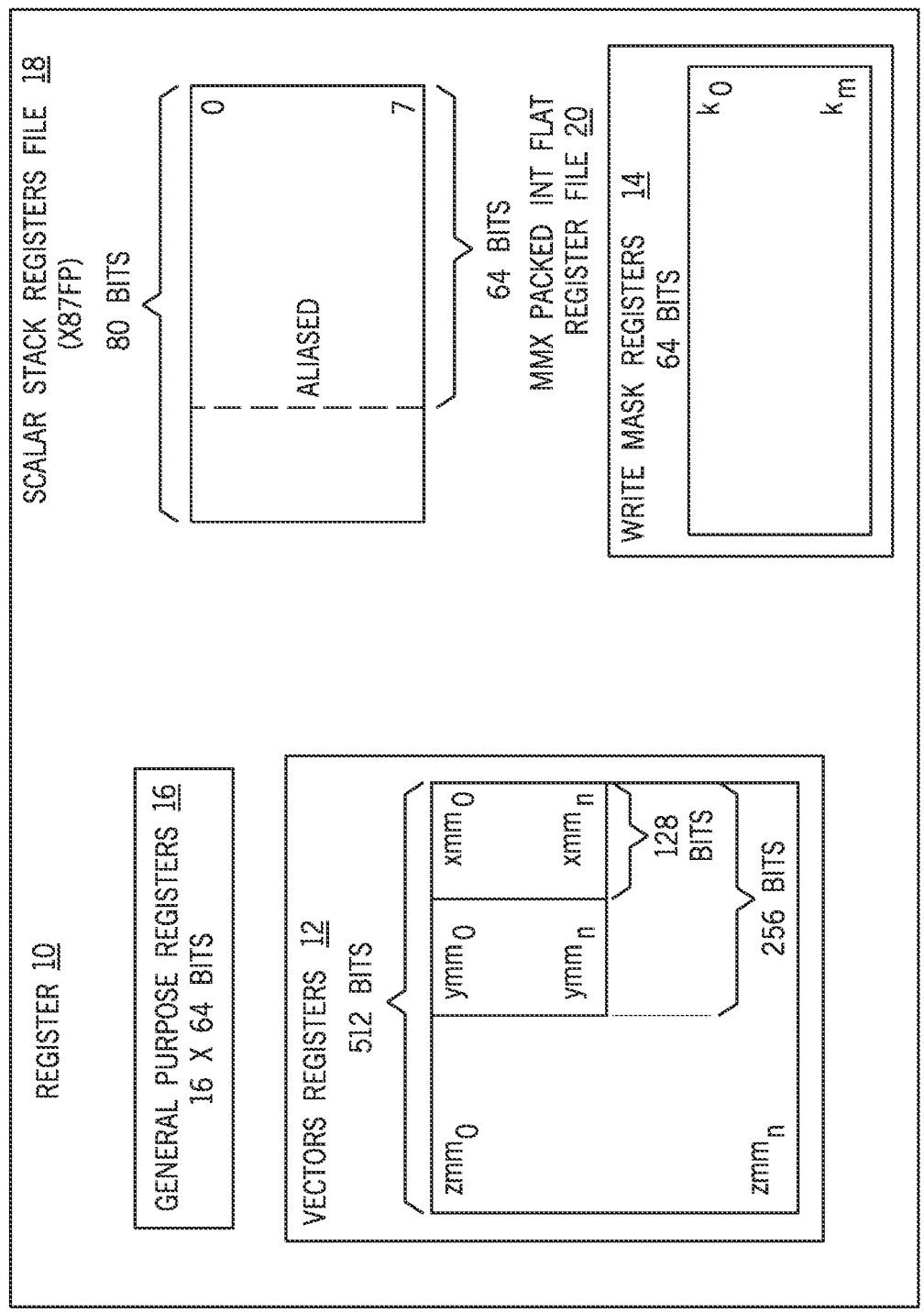
FIG. 1 is a block diagram of a register architecture, in accordance with an embodiment of the present disclosure.

FIG. 1 is a block diagram of a register architecture 10, in accordance with an embodiment of the present disclosure. In the embodiment illustrated, there are a number (e.g., 32) of vector registers 12 that may be a number (e.g., 512) of bits wide. In the register architecture 10; these registers are referenced as zmm0 through $zmm_i$. The lower order (e.g., 256) bits of the lower n (e.g., 16) zmm registers are overlaid on corresponding registers ymm. The lower order (e.g., 128 bits) of the lower n zmm registers that are also the lower order n bits of the ymm registers are overlaid on corresponding registers xmm.

Write mask registers 14 may include m (e.g., 8) write mask registers (k0 through km), each having a number (e.g., 64) of bits. Additionally or alternatively, at least some of the write mask registers 14 may have a different size (e.g., 16 bits). At least some of the vector mask registers 12 (e.g., k0) are prohibited from being used as a write mask. When such vector mask registers are indicated, a hardwired write mask (e.g., 0xFFFF) is selected and, effectively disabling write masking for that instruction.

General-purpose registers 16 may include a number (e.g., 16) of registers having corresponding bit sizes (e.g., 64) that are used along with x86 addressing modes to address memory operands. These registers may be referenced by the names RAX, RBX, RCX, RDX, RBP, RSI, RDI, RSP, and R8 through R15. Parts (e.g., 32 bits of the registers) of at least some of these registers may be used for modes (e.g., 32-bit mode) that is shorter than the complete length of the registers.

Scalar floating-point stack register file (x87 stack) 18 has an MMX packed integer flat register file 20 is aliased. The x87 stack 18 is an eight-element (or other number of elements) stack used to perform scalar floating-point operations on floating point data using the x87 instruction set extension. The floating-point data may have various levels of precision (e.g., 16, 32, 64, 80, or more bits). The MMX packed integer flat register files 20 are used to perform operations on 64-bit packed integer data, as well as to hold operands for some operations performed between the MMX packed integer flat register files 20 and the XMM registers.

Alternative embodiments may use wider or narrower registers. Additionally, alternative embodiments may use more, less, or different register files and registers.

Core Architectures, Processors, and Computer Architectures

Processor cores may be implemented in different ways, for different purposes, and in different processors. For instance, implementations of such cores may include: 1) a general purpose in-order core suitable for general-purpose computing; 2) a high performance general purpose out-of-order core suitable for general-purpose computing; 3) a special purpose core suitable for primarily for graphics and/or scientific (throughput) computing. Implementations of different processors may include: 1) a CPU including one or more general purpose in-order cores suitable for general-purpose computing and/or one or more general purpose out-of-order cores suitable for general-purpose computing; and 2) a coprocessor including one or more special purpose cores primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

In-Order and Out-of-Order Core Architecture

FIG. 2A is a block diagram illustrating an in-order pipeline and a register renaming, out-of-order issue/execution pipeline according to an embodiment of the disclosure. FIG. 2B is a block diagram illustrating both an embodiment of an in-order architecture core and an exemplary register renaming, out-of-order issue/execution architecture core to be included in a processor according to embodiments. The solid lined boxes in FIGS. 2A and 2B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 2A, a pipeline 30 in the processor includes a fetch stage 32, a length decode stage 34, a decode stage 36, an allocation stage 38, a renaming stage 40, a scheduling (also known as a dispatch or issue) stage 42, a register read/memory read stage 44, an execute stage 46, a write back/memory write stage 48, an exception handling stage 50, and a commit stage 52.

FIG. 2B shows a processor core 54 including a front-end unit 56 coupled to an execution engine unit 58, and both are coupled to a memory unit 60. The processor core 54 may be a reduced instruction set computing (RISC) core, a complex instruction set computing (CISC) core, a very long instruction word (VLIW) core, or other core types. As yet another option, the processor core 54 may be a special-purpose core, such as, for example, a network or communication core, compression engine, coprocessor core, general purpose computing graphics processing unit (GPGPU) core, graphics core, or the like.

The front-end unit 56 includes a branch prediction unit 62 coupled to an instruction cache unit 64 that is coupled to an instruction translation lookaside buffer (TLB) 66. The TLB 66 is coupled to an instruction fetch unit 68. The instruction fetch unit 68 is coupled to a decode circuitry 70. The decode circuitry 70 (or decoder) may decode instructions and generate as an output one or more micro-operations, micro-code entry points, microinstructions, other instructions, or other control signals, which are decoded from, or which otherwise reflect, or are derived from, the original instructions. The decode circuitry 70 may be implemented using various different mechanisms. Examples of suitable mechanisms include, but are not limited to, look-up tables, hardware implementations, programmable logic arrays (PLAs), microcode read only memories (ROMs), etc. The processor core 54 may include a microcode ROM or other medium that stores microcode for macroinstructions (e.g., in decode circuitry 70 or otherwise within the front-end unit 56). The decode circuitry 70 is coupled to a rename/allocator unit 72 in the execution engine unit 58.

The execution engine unit 58 includes a rename/allocator unit 72 coupled to a retirement unit 74 and a set of one or more scheduler unit(s) 76. The scheduler unit(s) 76 represents any number of different schedulers, including reservations stations, central instruction window, etc. The scheduler unit(s) 76 is coupled to physical register file(s) unit(s) 78. Each of the physical register file(s) unit(s) 78 represents one or more physical register files storing one or more different data types, such as scalar integers, scalar floating points, packed integers, packed floating points, vector integers, vector floating points, statuses (e.g., an instruction pointer that is the address of the next instruction to be executed), etc. In one embodiment, the physical register file(s) unit(s) 78 includes the vector registers 12, the write mask registers 14, and/or the x87 stack 18. These register units may provide architectural vector registers, vector mask registers, and general-purpose registers. The physical register file(s) unit(s) 78 is overlapped by the retirement unit 74 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.).

The retirement unit 74 and the physical register file(s) unit(s) 78 are coupled to an execution cluster(s) 80. The execution cluster(s) 80 includes a set of one or more execution units 82 and a set of one or more memory access circuitries 84. The execution units 82 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform multiple different functions. The scheduler unit(s) 76, physical register file(s) unit(s) 78, and execution cluster(s) 80 are shown as being singular or plural because some processor cores 54 create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster. In the case of a separate memory access pipeline, a processor core 54 for the separate memory access pipeline is the only the execution cluster 80 that has the memory access circuitry 84). It should also be understood that where separate pipelines are used, one or more of these pipelines may be out-of-order issue/execution and the rest perform in-order execution.

The set of memory access circuitry 84 is coupled to the memory unit 60. The memory unit 60 includes a data TLB unit 86 coupled to a data cache unit 88 coupled to a level 2 (L2) cache unit 90. The memory access circuitry 84 may include a load unit, a store address unit, and a store data unit, each of which is coupled to the data TLB unit 86 in the memory unit 60. The instruction cache unit 64 is further coupled to the level 2 (L2) cache unit 90 in the memory unit 60. The L2 cache unit 90 is coupled to one or more other levels of caches and/or to a main memory.

By way of example, the register renaming, out-of-order issue/execution core architecture may implement the pipeline 30 as follows: 1) the instruction fetch unit 68 performs the fetch and length decoding stages 32 and 34 of the pipeline 30; 2) the decode circuitry 70 performs the decode stage 36 of the pipeline 30; 3) the rename/allocator unit 72 performs the allocation stage 38 and renaming stage 40 of the pipeline; 4) the scheduler unit(s) 76 performs the schedule stage 42 of the pipeline 30; 5) the physical register file(s) unit(s) 78 and the memory unit 60 perform the register read/memory read stage 44 of the pipeline 30; the execution cluster 80 performs the execute stage 46 of the pipeline 30; 6) the memory unit 60 and the physical register file(s) unit(s) 78 perform the write back/memory write stage 48 of the pipeline 30; 7) various units may be involved in the exception handling stage 50 of the pipeline; and/or 8) the retirement unit 74 and the physical register file(s) unit(s) 78 perform the commit stage 52 of the pipeline 30.

The processor core 54 may support one or more instructions sets, such as an x86 instruction set (with or without additional extensions for newer versions); a MIPS instruction set of MIPS Technologies of Sunnyvale, CA; an ARM instruction set (with optional additional extensions such as NEON) of ARM Holdings of Sunnyvale, CA). Additionally or alternatively, the processor core 54 includes logic to support a packed data instruction set extension (e.g., AVX1, AVX2), thereby allowing the operations used by multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof, such as a time-sliced fetching and decoding and simultaneous multithreading in INTEL® Hyperthreading technology.

While register renaming is described in the context of out-of-order execution, register renaming may be used in an in-order architecture. While the illustrated embodiment of the processor also includes a separate instruction cache unit 64, a separate data cache unit 88, and a shared L2 cache unit 90, some processors may have a single internal cache for both instructions and data, such as, for example, a Level 1 (L1) internal cache, or multiple levels of the internal cache. In some embodiments, the processor may include a combination of an internal cache and an external cache that is external to the processor core 54 and/or the processor. Alternatively, some processors may use a cache that is external to the processor core 54 and/or the processor.

Figure 3B:
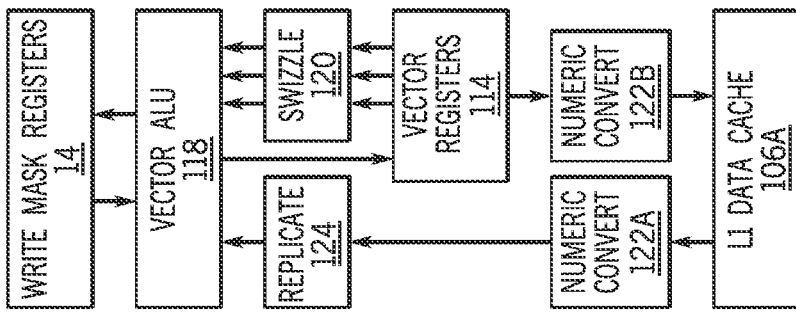
FIGS. 3A and 3B illustrate a block diagram of a more specific exemplary in-order core architecture, which core would be one of several logic blocks (including other cores of the same type and/or different types) in a chip, in accordance with an embodiment of the present disclosure.
Figure 3A:
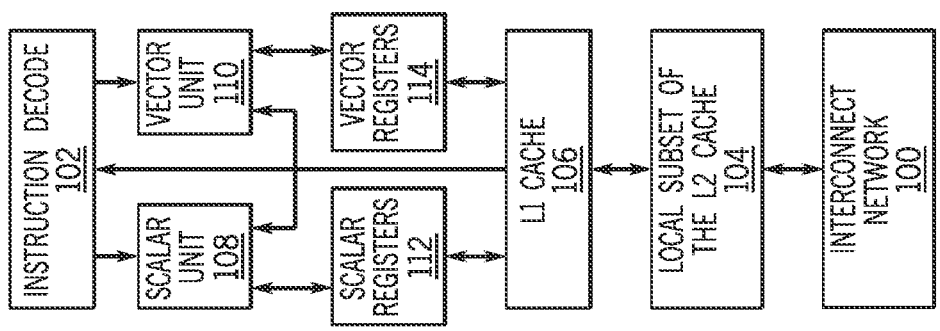

FIGS. 3A and 3B illustrate more detailed block diagrams of an in-order core architecture. The processor core 54 includes one or more logic blocks (including other cores of the same type and/or different types) in a chip. The logic blocks communicate through a high-bandwidth interconnect network (e.g., a ring network) with some fixed function logic, memory I/O interfaces, and other I/O logic, depending on the application.

FIG. 3A is a block diagram of a single processor core 54, along with its connection to an on-die interconnect network 100 and with its local subset of the Level 2 (L2) cache 104, according to embodiments of the disclosure. In one embodiment, an instruction decoder 102 supports the x86 instruction set with a packed data instruction set extension. An L1 cache 106 allows low-latency accesses to cache memory into the scalar and vector units. While in one embodiment (to simplify the design), a scalar unit 108 and a vector unit 110 use separate register sets (respectively, scalar registers 112 (e.g., x87 stack 18) and vector registers 114 (e.g., vector registers 12) and data transferred between them is written to memory and then read back in from a level 1 (L1) cache 106, alternative embodiments of the disclosure may use a different approach (e.g., use a single register set or include a communication path that allow data to be transferred between the two register files without being written and read back).

The local subset of the L2 cache 104 is part of a global L2 cache unit 90 that is divided into separate local subsets, one per processor core. Each processor core 54 has a direct access path to its own local subset of the L2 cache 104. Data read by a processor core 54 is stored in its L2 cache 104 subset and can be accessed quickly, in parallel with other processor cores 54 accessing their own local L2 cache subsets. Data written by a processor core 54 is stored in its own L2 cache 104 subset and is flushed from other subsets, if necessary. The interconnection network 100 ensures coherency for shared data. The interconnection network 100 is bi-directional to allow agents such as processor cores, L2 caches, and other logic blocks to communicate with each other within the chip. Each data-path may have a number (e.g., 1012) of bits in width per direction.

FIG. 3B is an expanded view of part of the processor core in FIG. 3A according to embodiments of the disclosure. FIG. 3B includes an L1 data cache 106A part of the L1 cache 106, as well as more detail regarding the vector unit 110 and the vector registers 114. Specifically, the vector unit 110 may be a vector processing unit (VPU) (e.g., a vector arithmetic logic unit (ALU) 118) that executes one or more of integer, single-precision float, and double-precision float instructions. The VPU supports swizzling the register inputs with swizzle unit 120, numeric conversion with numeric convert units 122A and 122B, and replication with replication unit 124 on the memory input. The write mask registers 14 allow predicating resulting vector writes.

Figure 4:
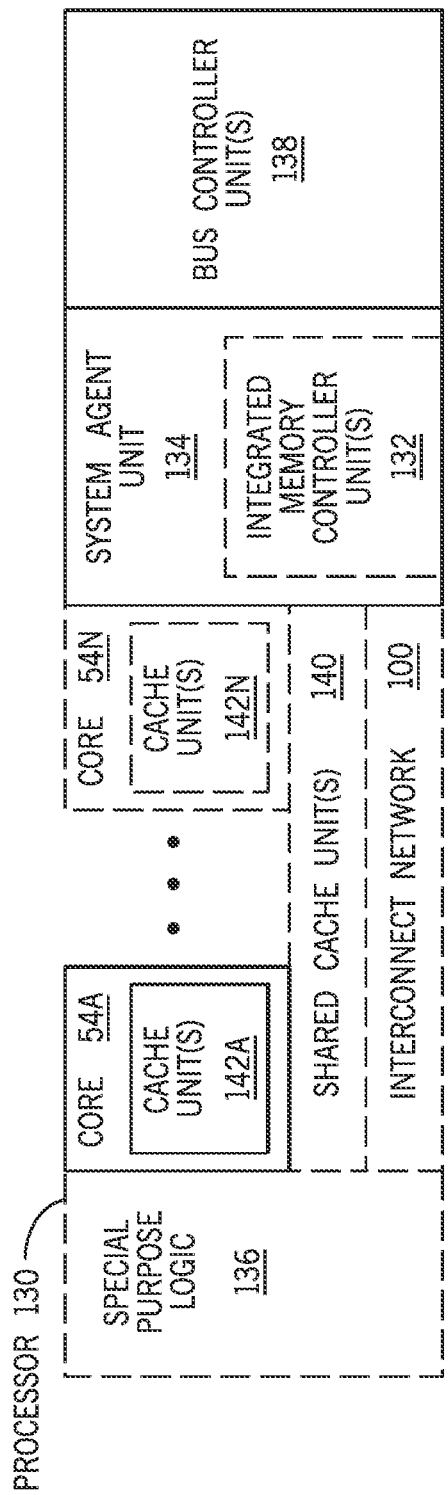
FIG. 4 is a block diagram of a processor that may have more than one core, may have an integrated memory controller, and may have integrated graphics, in accordance with an embodiment of the present disclosure.

FIG. 4 is a block diagram of a processor 130 that may have more than one processor core 54, may have an integrated memory controller unit(s) 132, and may have integrated graphics according to embodiments of the disclosure. The solid lined boxes in FIG. 4 illustrate a processor 130 with a single core 54A, a system agent unit 134, a set of one or more bus controller unit(s) 138, while the optional addition of the dashed lined boxes illustrates the processor 130 with multiple cores 54A-N, a set of one or more integrated memory controller unit(s) 132 in the system agent unit 134, and a special purpose logic 136.

Thus, different implementations of the processor 130 may include: 1) a CPU with the special purpose logic 136 being integrated graphics and/or scientific (throughput) logic (which may include one or more cores), and the cores 54A-N being one or more general purpose cores (e.g., general purpose in-order cores, general purpose out-of-order cores, or a combination thereof); 2) a coprocessor with the cores 54A-N being a relatively large number of special purpose cores intended primarily for graphics and/or scientific (throughput); and 3) a coprocessor with the cores 54A-N being a relatively large number of general purpose in-order cores. Thus, the processor 130 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), an embedded processor, or the like. The processor 130 may be implemented on one or more chips. The processor 130 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 140, and external memory (not shown) coupled to the set of integrated memory controller unit(s) 132. The set of shared cache units 140 may include one or more mid-level caches, such as level 2 (L2), level 3 (L3), level 4 (L4), or other levels of cache, a last level cache (LLC), and/or combinations thereof. While a ring-based interconnect network 100 may interconnect the integrated graphics logic 136 (integrated graphics logic 136 is an example of and is also referred to herein as special purpose logic 136), the set of shared cache units 140, and/or the system agent unit 134/integrated memory controller unit(s) 132 may use any number of known techniques for interconnecting such units. For example, coherency may be maintained between one or more cache units 142A-N and cores 54A-N.

In some embodiments, one or more of the cores 54A-N are capable of multi-threading. The system agent unit 134 includes those components coordinating and operating cores 54A-N. The system agent unit 134 may include, for example, a power control unit (PCU) and a display unit. The PCU may be or may include logic and components used to regulate the power state of the cores 54A-N and the integrated graphics logic 136. The display unit is used to drive one or more externally connected displays.

The cores 54A-N may be homogenous or heterogeneous in terms of architecture instruction set. That is, two or more of the cores 54A-N may be capable of execution of the same instruction set, while others may be capable of executing only a subset of a single instruction set or a different instruction set.

Computer Architecture

FIGS. 5-8 are block diagrams of embodiments of computer architectures. These architectures may be suitable for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices. In general, a wide variety of systems or electronic devices capable of incorporating the processor 130 and/or other execution logic.

Figure 5:
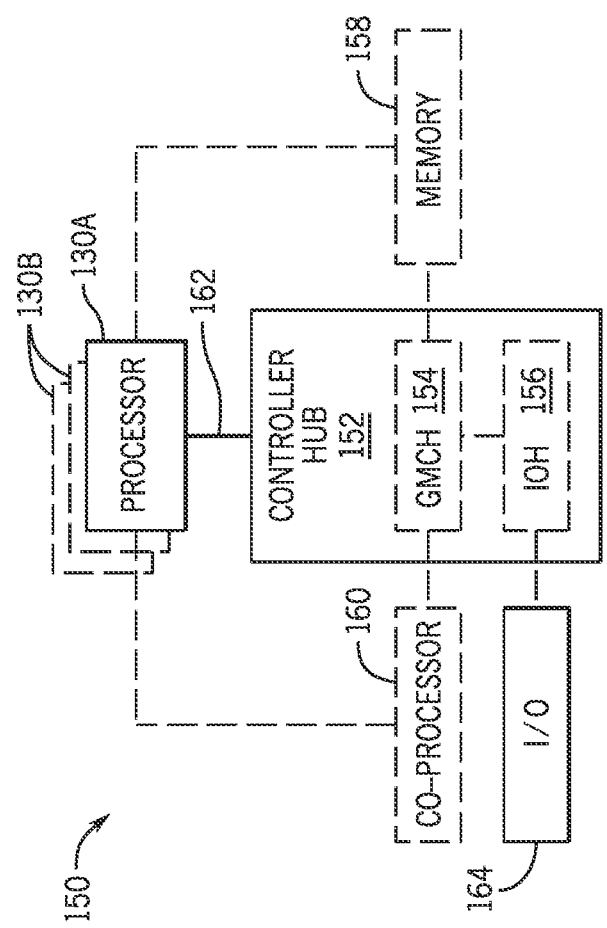
FIG. 5 shown a block diagram of a system, in accordance with an embodiment of the present disclosure.

Referring now to FIG. 5, shown is a block diagram of a system 150 in accordance with an embodiment of the present disclosure. The system 150 may include one or more processors 130A, 130B that is coupled to a controller hub 152. The controller hub 152 may include a graphics memory controller hub (GMCH) 154 and an Input/Output Hub (IOH) 156 (which may be on separate chips); the GMCH 154 includes memory and graphics controllers to which are coupled memory 158 and a coprocessor 160; the IOH 156 couples input/output (I/O) devices 164 to the GMCH 154. Alternatively, one or both of the memory and graphics controllers are integrated within the processor 130 (as described herein), the memory 158 and the coprocessor 160 are coupled to (e.g., directly to) the processor 130A, and the controller hub 152 in a single chip with the IOH 156.

The optional nature of an additional processor 130B is denoted in FIG. 5 with broken lines. Each processor 130A, 130B may include one or more of the processor cores 54 described herein and may be some version of the processor 130.

The memory 158 may be, for example, dynamic random-access memory (DRAM), phase change memory (PCM), or a combination thereof. For at least one embodiment, the controller hub 152 communicates with the processor(s) 130A, 130B via a multi-drop bus, such as a frontside bus (FSB), point-to-point interface such as QuickPath Interconnect (QPI), or similar connection 162.

In one embodiment, the coprocessor 160 is a special-purpose processor, such as, for example, a high-throughput MIC processor, a network or communication processor, a compression engine, a graphics processor, a GPGPU, an embedded processor, or the like. In an embodiment, the controller hub 152 may include an integrated graphics accelerator.

There can be a variety of differences between the physical resources of the processors 130A, 130B in terms of a spectrum of metrics of merit including architectural, micro-architectural, thermal, power consumption characteristics, and the like.

In some embodiments, the processor 130A executes instructions that control data processing operations of a general type. Embedded within the instructions may be coprocessor instructions. The processor 130A recognizes these coprocessor instructions as being of a type that should be executed by the attached coprocessor 160. Accordingly, the processor 130A issues these coprocessor instructions (or control signals representing coprocessor instructions) on a coprocessor bus or other interconnect, to the coprocessor 160. The coprocessor 160 accepts and executes the received coprocessor instructions.

Figure 6:
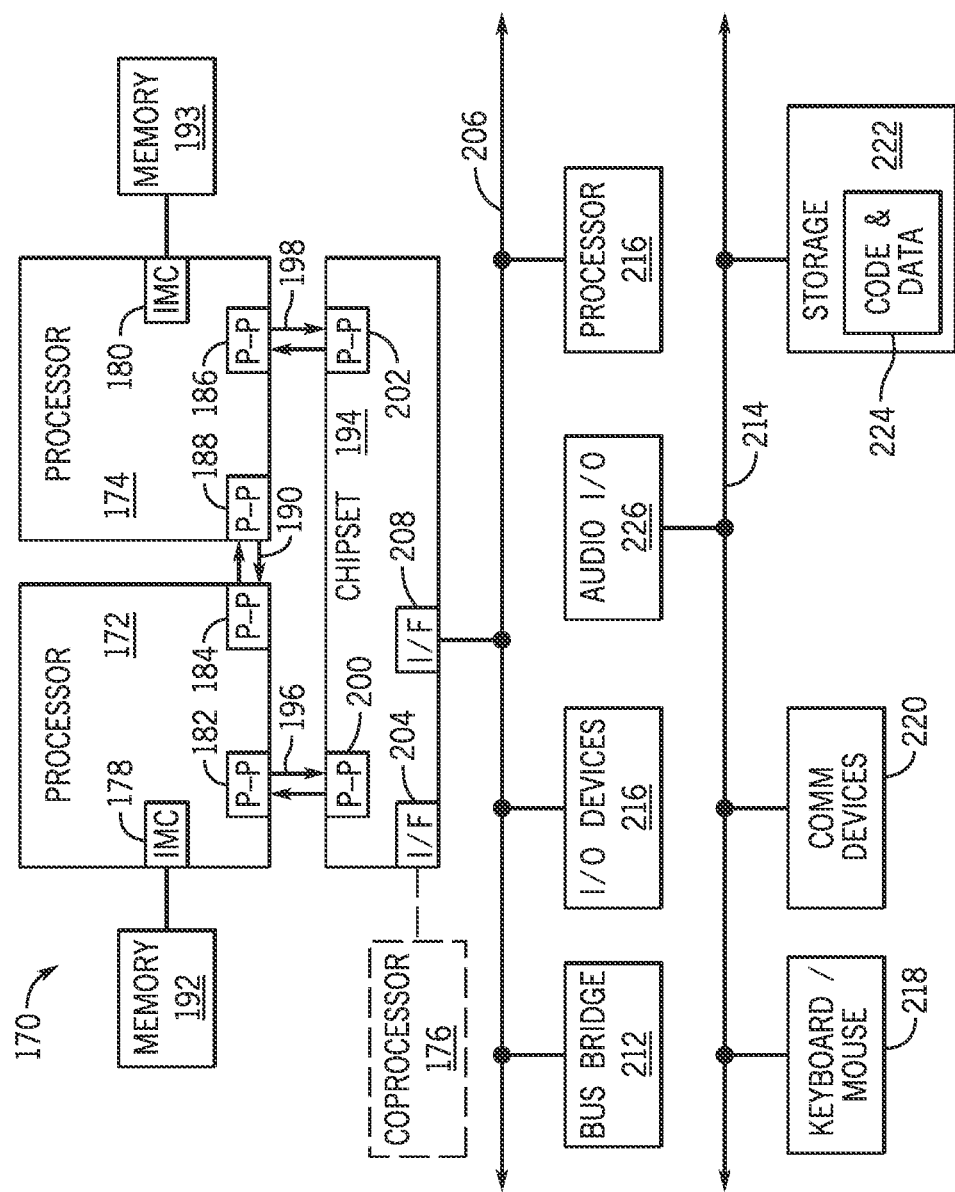
FIG. 6 is a block diagram of a first more specific exemplary system, in accordance with an embodiment of the present disclosure.

Referring now to FIG. 6, shown is a more detailed block diagram of a multiprocessor system 170 in accordance with an embodiment of the present disclosure. As shown in FIG. 6, the multiprocessor system 170 is a point-to-point interconnect system, and includes a processor 172 and a processor 174 coupled via a point-to-point interface 190. Each of processors 172 and 174 may be some version of the processor 130. In one embodiment of the disclosure, processors 172 and 174 are respectively processors 130A and 130B, while coprocessor 176 is coprocessor 160. In another embodiment, processors 172 and 174 are respectively processor 130A and coprocessor 160.

Processors 172 and 174 are shown including integrated memory controller (IMC) units 178 and 180, respectively. The processor 172 also includes point-to-point (P-P) interfaces 182 and 184 as part of its bus controller units. Similarly, the processor 174 includes P-P interfaces 186 and 188. The processors 172, 174 may exchange information via a point-to-point interface 190 using P-P interfaces 184, 188. As shown in FIG. 6, IMCs 178 and 180 couple the processors to respective memories, namely a memory 192 and a memory 193 that may be different portions of main memory locally attached to the respective processors 172, 174.

Processors 172, 174 may each exchange information with a chipset 194 via individual P-P interfaces 196, 198 using point-to-point interfaces 182, 200, 186, 202. Chipset 194 may optionally exchange information with the coprocessor 176 via a high-performance interface 204. In an embodiment, the coprocessor 176 is a special-purpose processor, such as, for example, a high-throughput MIC processor, a network or communication processor, a compression engine, a graphics processor, a GPGPU, an embedded processor, or the like.

A shared cache (not shown) may be included in either processor 172 or 174 or outside of both processors 172 or 174 that is connected with the processors 172, 174 via respective P-P interconnects such that either or both processors' local cache information may be stored in the shared cache if a respective processor is placed into a low power mode.

The chipset 194 may be coupled to a first bus 206 via an interface 208. In an embodiment, the first bus 206 may be a Peripheral Component Interconnect (PCI) bus or a bus such as a PCI Express bus or another third generation I/O interconnect bus, although the scope of the present disclosure is not so limited.

As shown in FIG. 6, various I/O devices 210 may be coupled to first bus 206, along with a bus bridge 212 that couples the first bus 206 to a second bus 214. In an embodiment, one or more additional processor(s) 216, such as coprocessors, high-throughput MIC processors, GPGPUs, accelerators (such as, e.g., graphics accelerators or digital signal processing (DSP) units), field programmable gate arrays, or any other processors, are coupled to the first bus 206. In an embodiment, the second bus 214 may be a low pin count (LPC) bus. Various devices may be coupled to the second bus 214 including, for example, a keyboard and/or mouse 218, communication devices 220 and a storage unit 222 such as a disk drive or other mass storage device which may include instructions/code and data 224, in an embodiment. Further, an audio I/O 226 may be coupled to the second bus 214. Note that other architectures may be deployed for the multiprocessor system 170. For example, instead of the point-to-point architecture of FIG. 6, the multiprocessor system 170 may implement a multi-drop bus or other such architectures.

Figure 7:
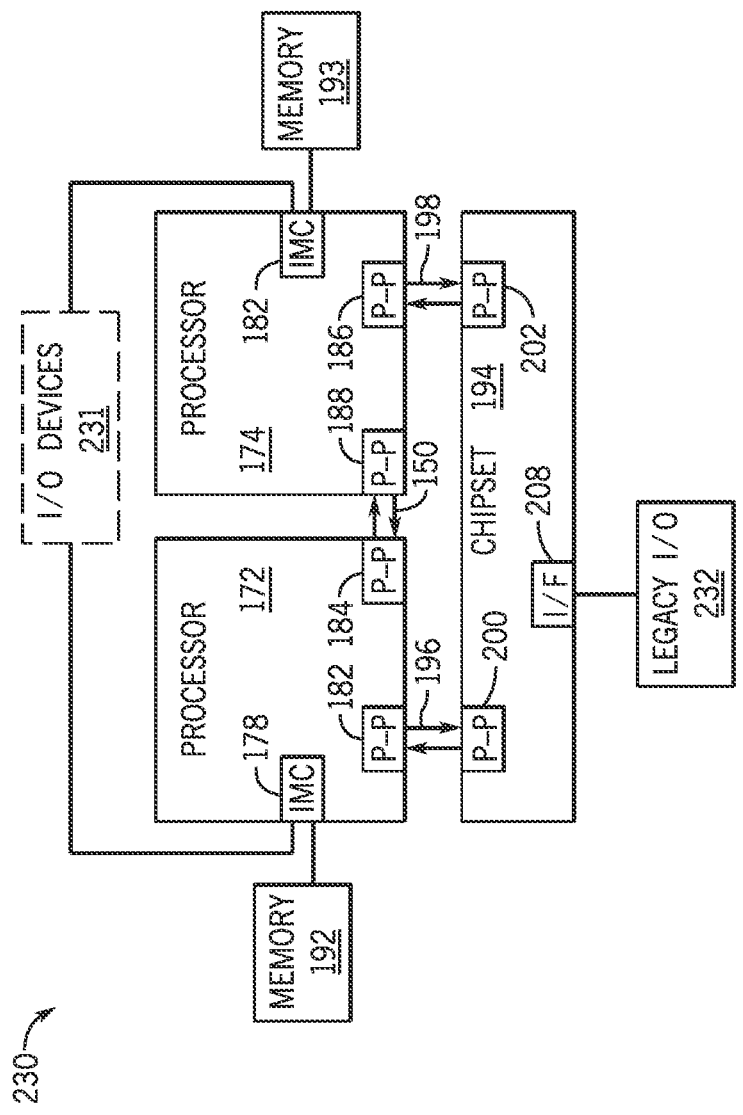
FIG. 7 is a block diagram of a second more specific exemplary system, in accordance with an embodiment of the present disclosure.

Referring now to FIG. 7, shown is a block diagram of a system 230 in accordance with an embodiment of the present disclosure. Like elements in FIGS. 7 and 8 contain like reference numerals, and certain aspects of FIG. 6 have been omitted from FIG. 7 to avoid obscuring other aspects of FIG. 7.

FIG. 7 illustrates that the processors 172, 174 may include integrated memory and I/O control logic ("IMC") 178 and 180, respectively. Thus, the IMC 178, 180 include integrated memory controller units and include I/O control logic. FIG. 7 illustrates that not only are the memories 192, 193 coupled to the IMC 178, 180, but also that I/O devices 231 are also coupled to the IMC 178, 180. Legacy I/O devices 232 are coupled to the chipset 194 via the interface 208.

Figure 8:
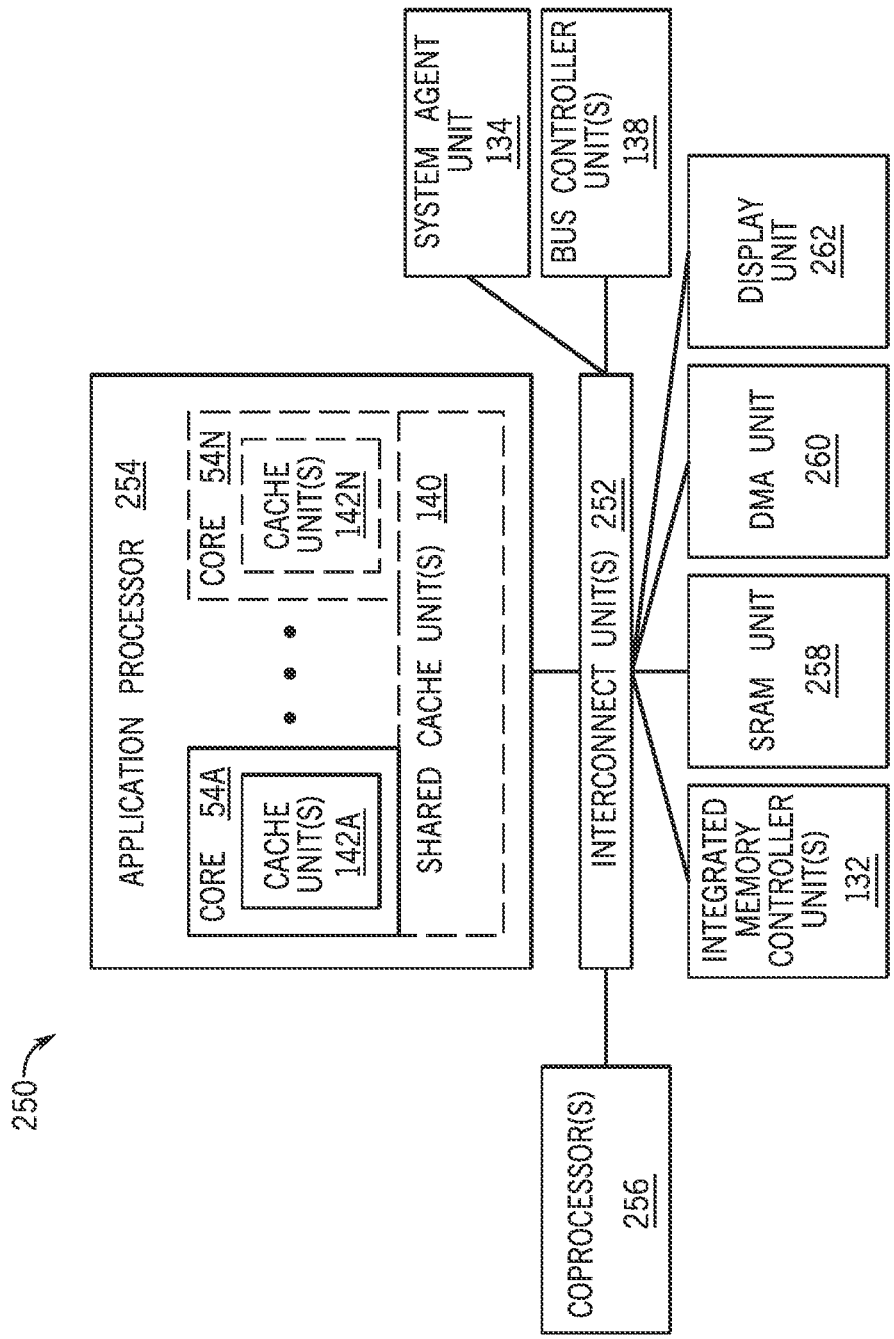
FIG. 8 is a block diagram of a system on a chip (SoC), in accordance with an embodiment of the present disclosure.

Referring now to FIG. 8, shown is a block diagram of a SoC 250 in accordance with an embodiment of the present disclosure. Similar elements in FIG. 4 have like reference numerals. Also, dashed lined boxes are optional features included in some SoCs 250. In FIG. 8, an interconnect unit(s) 252 is coupled to: an application processor 254 that includes a set of one or more cores 54A-N that includes cache units 142A-N, and shared cache unit(s) 140; a system agent unit 134; a bus controller unit(s) 138; an integrated memory controller unit(s) 132; a set or one or more coprocessors 256 that may include integrated graphics logic, an image processor, an audio processor, and/or a video processor; a static random access memory (SRAM) unit 258; a direct memory access (DMA) unit 260; and a display unit 262 to couple to one or more external displays. In an embodiment, the coprocessor(s) 256 include a special-purpose processor, such as, for example, a network or communication processor, a compression engine, a GPGPU, a high-throughput MIC processor, an embedded processor, or the like.

Embodiments of the mechanisms disclosed herein may be implemented in hardware, software, firmware, or a combination of such implementation approaches. Embodiments of the disclosure may be implemented as computer programs and/or program code executing on programmable systems including at least one processor, a storage system (including volatile and non-volatile memory and/or storage elements), at least one input device, and at least one output device.

Program code, such as data 224 illustrated in FIG. 6, may be applied to input instructions to perform the functions described herein and generate output information. The output information may be applied to one or more output devices. For purposes of this application, a processing system includes any system that has a processor, such as, for example, a digital signal processor (DSP), a microcontroller, an application-specific integrated circuit (ASIC), or a microprocessor.

The program code may be implemented in a high-level procedural or object-oriented programming language to communicate with a processing system. The program code may also be implemented in an assembly language or in a machine language. In fact, the mechanisms described herein are not limited in scope to any particular programming language. In any case, the language may be a compiled language or an interpreted language.

One or more aspects of at least one embodiment may be implemented by representative instructions stored on a machine-readable medium that represents various logic within the processor that, when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic cards, optical cards, or any other type of media suitable for storing electronic instructions.

Accordingly, embodiments of the embodiment include non-transitory, tangible machine-readable media containing instructions or containing design data, such as designs in Hardware Description Language (HDL) that may define structures, circuits, apparatuses, processors and/or system features described herein. Such embodiments may also be referred to as program products.

Emulation

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert instructions to one or more other instructions to be processed by the core. The instruction converter may be implemented in software, hardware, firmware, or a combination thereof. The instruction converter may be implemented on processor, off processor, or part on and part off processor.

Figure 9:
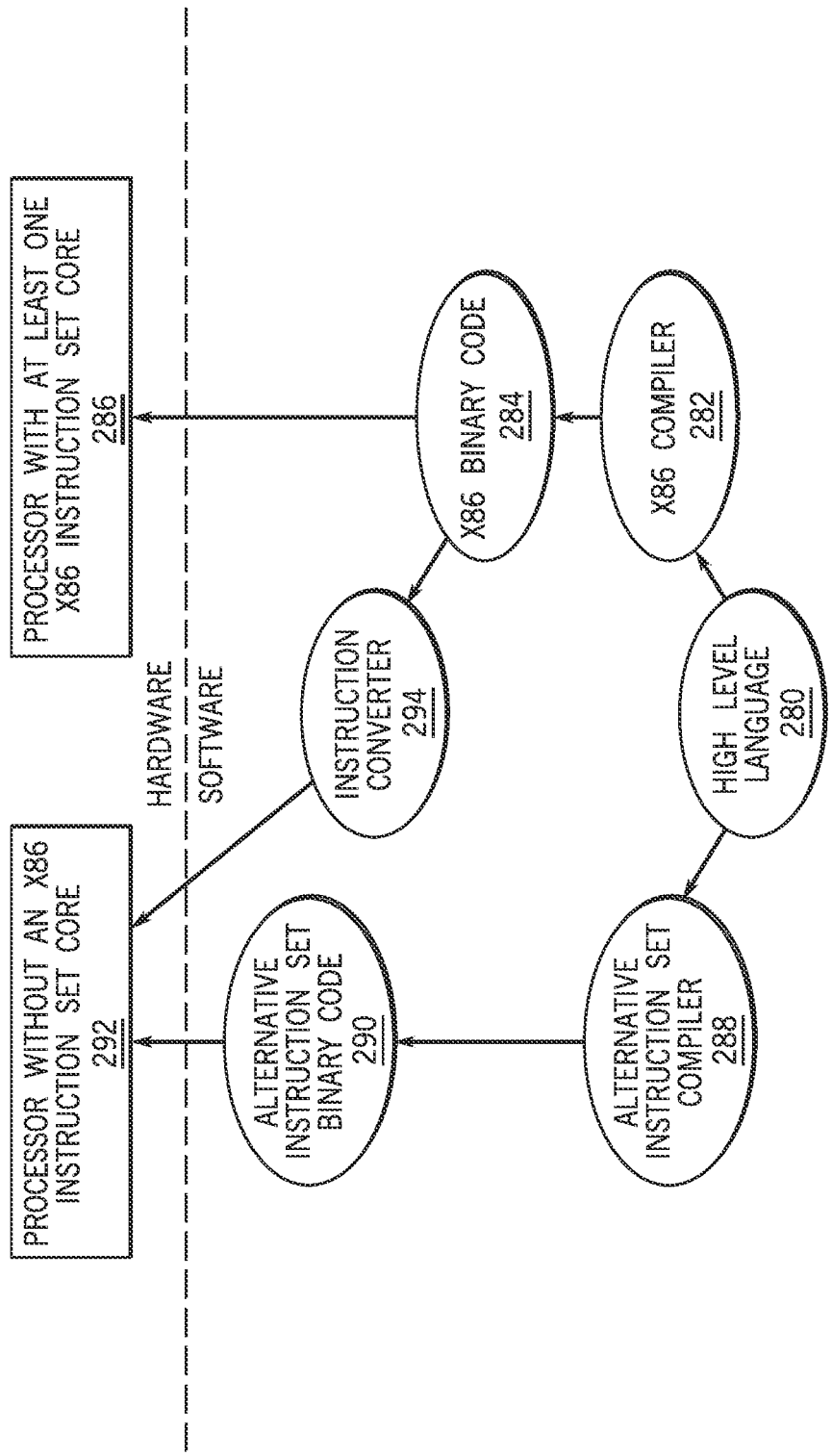
FIG. 9 is a block diagram contrasting the use of a software instruction converter to convert binary instructions in a source instruction set to binary instructions in a target instruction set, in accordance with an embodiment of the present disclosure.

FIG. 9 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or any combinations thereof. FIG. 9 shows a program in a high-level language 280 may be compiled using an x86 compiler 282 to generate x86 binary code 284 that may be natively executed by a processor with at least one x86 instruction set core 286. The processor with at least one x86 instruction set core 286 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 282 represents a compiler that is operable to generate x86 binary code 284 (e.g., object code) that can, with or without additional linkage processing, be executed on the processor with at least one x86 instruction set core 286.

Similarly, FIG. 9 shows the program in the high-level language 280 may be compiled using an alternative instruction set compiler 288 to generate alternative instruction set binary code 290 that may be natively executed by a processor without at least one x86 instruction set core 292 (e.g., a processor with processor cores 54 that execute the MIPS instruction set of MIPS Technologies of Sunnyvale, CA and/or that execute the ARM instruction set of ARM Holdings of Sunnyvale, CA). An instruction converter 294 is used to convert the x86 binary code 284 into code that may be natively executed by the processor without an x86 instruction set core 292. This converted code is not likely to be the same as the alternative instruction set binary code 290 because an instruction converter capable of this is difficult to make; however, the converted code may accomplish the general operation and be made up of instructions from the alternative instruction set. Thus, the instruction converter 294 represents software, firmware, hardware, or a combination thereof that, through emulation, simulation or any other process, allows a processor or other electronic device that does not have an x86 instruction set processor or core to execute the x86 binary code 284.

Interrupt Handling

Figure 10:
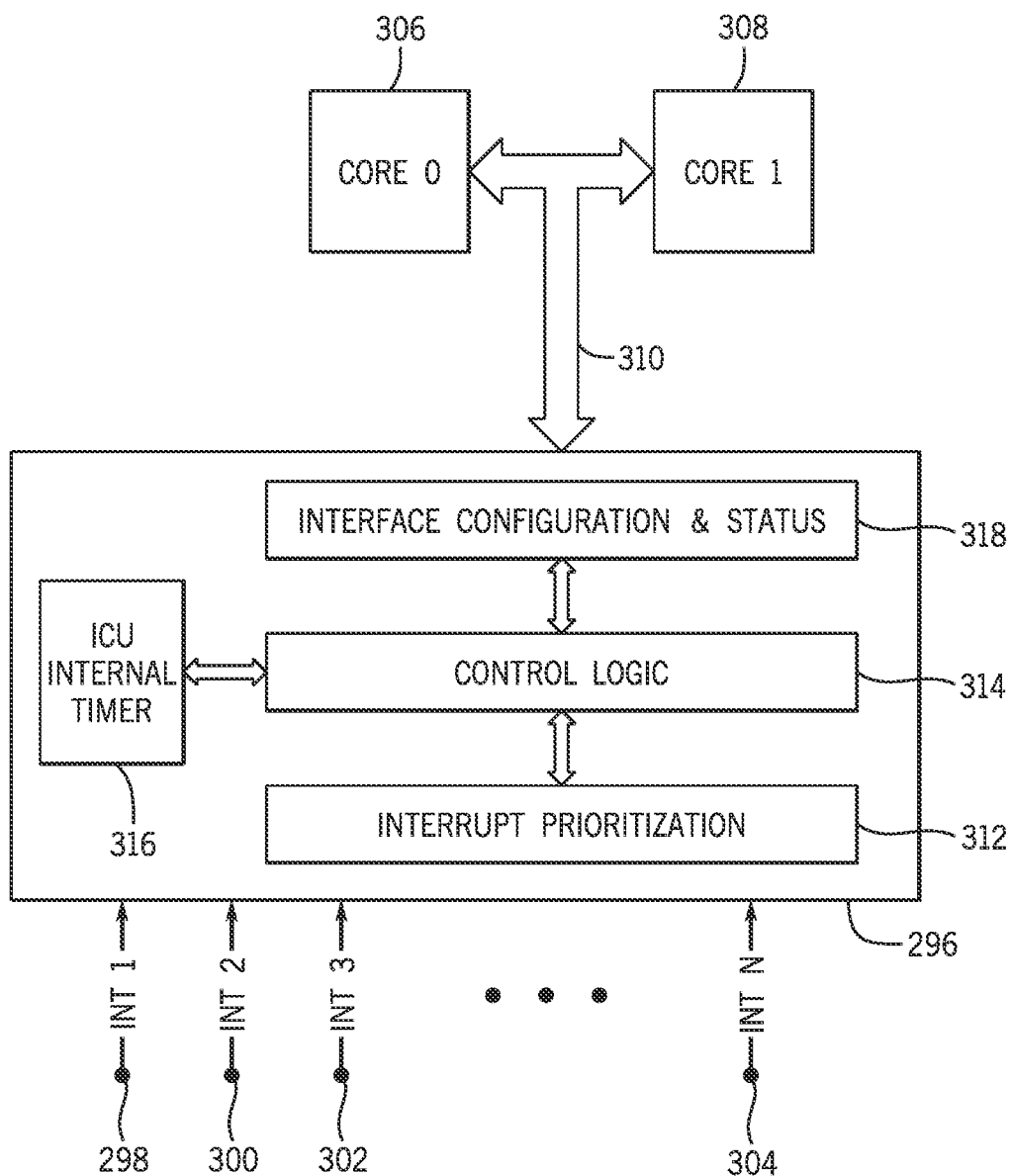
FIG. 10 is a block diagram of an interrupt system including an interrupt controller, in accordance with an embodiment of the present disclosure.

FIG. 10 shows an interrupt system 295 that may be part of any of the foregoing processors/SoCs. As illustrated, the interrupt system 295 includes an interrupt controller 296 to control transmission of interrupts 298, 300, 302, and 304 to respective cores 306 and/or 308 of the processor/SoC via a bus 310 and/or another communication mechanism. Although the interrupt requests 298, 300, 302, and 304 are discussed for the following embodiments, it should be understood that the interrupt controller 296 may also be used to manage exceptions and/or the processor may include an exceptions controller that may be used to manage exceptions similarly to how the interrupt controller 296 is discussed as handling interrupts. Furthermore, although the illustrated embodiment of the interrupt controller 296 receives four interrupt requests, the interrupt controller 296 may receive any fewer or more interrupt requests. For instance, the interrupt controller 296 may be configured to process more than four or less than four interrupt requests.

The interrupt requests 298, 300, 302, and/or 304 may be generated internally within the interrupt controller 296 and/or another part of the processor/SoC (e.g., peripheral devices). Additionally or alternatively the interrupt requests 298, 300, 302, and/or 304 may be generated in Internet of Things (IoT) devices, wearable devices, tablets, mobile phones, and the like. The interrupt controller 296 determines when to release the interrupt requests 298, 300, 302, and/or 304 as respective interrupt signals transmitted to the cores 306 and 308 generated from their respective interrupt requests.

The interrupt controller 296 stores interrupt prioritizations 312 to indicate which interrupt requests are to be prioritized and performed prior to other interrupt requests even if the other interrupt requests are received earlier than the higher priority interrupt request. Control logic 314 stored and/or executed in the interrupt controller 296 is used to decide which interrupt signal is to be transmitted to a specified core 306 and/or 308. For instance, the control logic 314 may store affinities between certain cores and interrupts to use such cores to service the respective interrupt. The interrupt controller 296 also includes an interrupt controller internal timer 316 to be used by the control logic 314 to control timing of interrupt signal transmissions to the cores 306 and 308. The interrupt controller 296 includes interface configuration and status circuitry 318 that is used to provide an interface to the cores 306 and 308 and to track statuses of the cores 306 and/or 308 and processing of the interrupt requests 298, 300, 302, and/or 304.

Figure 11:
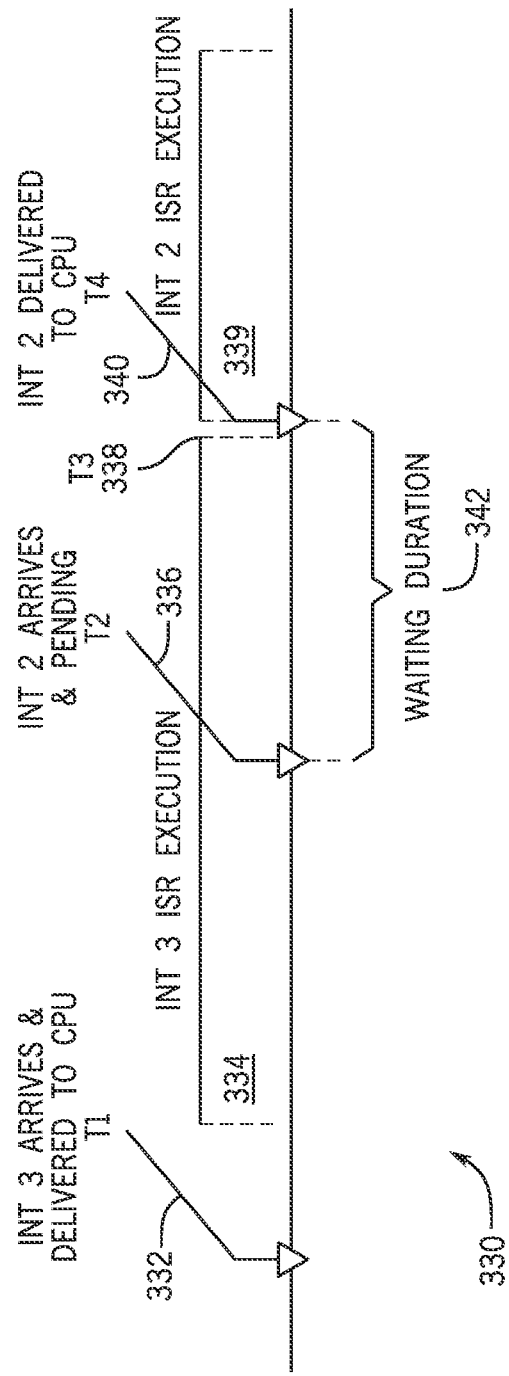
FIG. 11 is a timing diagram of a process for transmitting interrupt signals using the interrupt controller of FIG. 10, in accordance with an embodiment of the present disclosure.

FIG. 11 is a timing diagram 330 of an embodiment of interrupt timing using the interrupt system 295 of FIG. 10. As illustrated, at time T1 332, the interrupt controller 296 receives a first interrupt request, such as the interrupt request 302. This received interrupt request causes the interrupt controller 296 to transmit an interrupt signal corresponding to the interrupt request 302 to a core (e.g., core 306) that executes an interrupt service routine (ISR) 334 to service the corresponding interrupt. During the ISR execution 334, at T2 336, the interrupt controller 296 receives a second interrupt request (e.g., the interrupt request 300). The second interrupt is to be serviced by the same core as the first interrupt. Furthermore, assuming that the second interrupt has a lower priority than the first priority, the interrupt controller 296 will not deliver a second interrupt request corresponding the second interrupt request to the core of the CPU until the first interrupt has been serviced and/or acknowledged. For instance, the timing diagram 330 shows the ISR execution 334 completing at T3 338, and an ISR execution 339 during which the second interrupt is handled starts at T4 340 after the first interrupt is acknowledged and the second interrupt signal is sent to the core. Accordingly, the second interrupt waits during a waiting duration 342 between arrival of the second interrupt request at T2 336 and beginning of the ISR execution 339 at T4 340. However, in real-time systems (e.g., medical, IOTG, and/or modem devices), many interrupts (e.g., the second interrupt) may be time critical with its own strict timing constraints. The latency introduced by waiting at the interrupt controller 296 may have significant impact to software running on the devices to maintain the time-critical characteristics. Furthermore, in some embodiments, software and/or hardware may profile the interrupt latency at the CPU level by tracking the time the interrupt between the interrupt request being received the CPU and the time at which this interrupt was serviced by the ISR. Such tracking may not be able to track how much time the interrupt request was kept pending at the interrupt controller 296 level before the corresponding interrupt signal was delivered to CPU by interrupt controller 296. By expanding the interrupt controller 296 to include registers to track such information and/or migrate interrupts between cores, the interrupt controller 296 may enable the software and/or circuitry to utilize the time an interrupt is waiting due to delays at the interrupt controller 296. By enhancing the interrupt controller 296 to provide a configurable threshold time for an interrupt request beyond which the interrupt request can be routed to another targeted core that may be idle and ready to service the interrupt. The software and/or hardware may be used to profile such interrupts that are serviced by other cores due to waiting threshold time expiry and based on the collected data. These profiles may be used to further tune and change the affinity of the interrupt permanently to the newly targeted core to increase performance/efficiency of the system including the cores and the interrupt controller 296.

Figure 12:
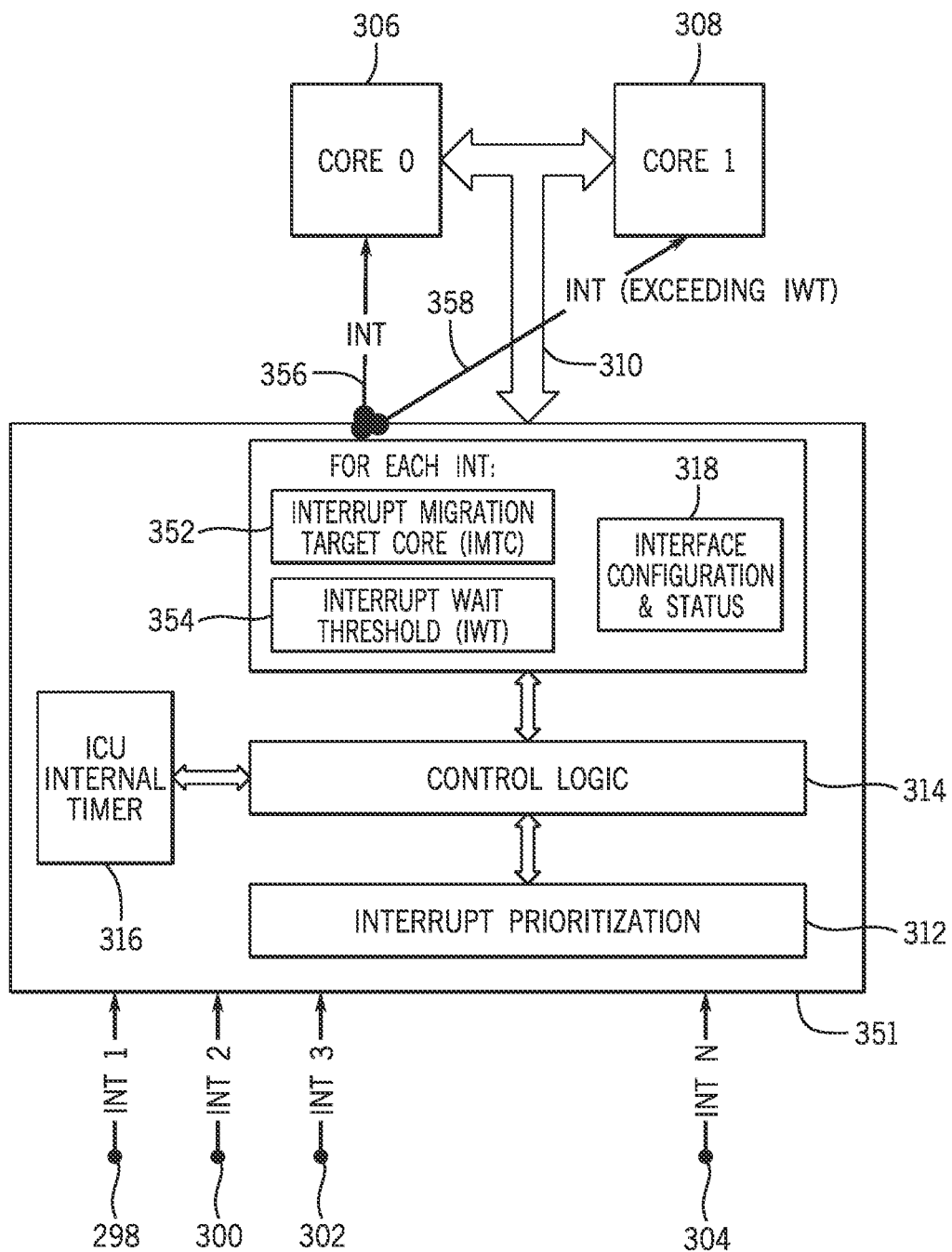
FIG. 12 is a system of including an interrupt controller configured to perform interrupt migrations, in accordance with an embodiment of the present disclosure.

FIG. 12 is a block diagram of an interrupt system 350 that has an interrupt controller 351. The interrupt system 350 is similar to the interrupt system 295 except that the interrupt controller 351 is configured to perform interrupt migration between the cores 306 and 308 and/or other cores. To enable this migration, the interrupt controller 351 includes an interrupt wait threshold (IWT) register 352 to store an indication of a duration that the interrupt request may wait before the interrupt controller 351 attempts to migrate the interrupt to a different core (e.g., from core 306 to 308) by sending an interrupt signal to the different core. The interrupt controller 351 also includes an interrupt migration target core (IMTC) register 354 that indicates a next target core (e.g., the core 1) that is to be targeted for a migration when the respective interrupt is to be migrated. The IMTC register 354 may indicate a single core as a potential target or may specify any number of cores as potential targets for the respective interrupt. When the IMTC register 354 specifies multiple cores, the target cores may be prioritized into different tiers. Alternatively, all target cores may have a same level of priority. As illustrated, an IWT register 352 value may be stored for each interrupt, and an IMTC register 354 value may be stored for each interrupt. However, in some embodiments, some interrupts (e.g., non-critical interrupts) may not have an IWT and/or IMTC value stored in the respective registers.

By enhancing the interrupt controller 351 to include the IWT register 352 and the IMTC register 354, the system may have added flexibility as software may be used to configure the IWT register 352 and/or the IMTC register 354. Thus, software and/or circuitry may be used to dynamically set when to initiate migration for an interrupt and set where the interrupt is to be migrated. For instance, the interrupt controller 351 may receive an interrupt request (e.g., interrupt requests 298, 300, 302, and/or 304). The interrupt controller 351 then transmits the interrupt signal 356 over the bus 310 to the core 306. However, the core 306 may be unable to service the interrupt corresponding to the interrupt signal 356. Accordingly, the interrupt controller 351 may count a number of clock cycles of the internal timer 316 to determine how long the interrupt signal 356 has waited for the core 306 to service the interrupt. When the duration of waiting exceeds the value indicated in the IWT register 352 for the interrupt, the interrupt controller 351 migrates the interrupt to the core 308 using a second interrupt signal 358 for the interrupt over the bus 310. In some embodiments, if the second interrupt signal 368 to the core 308 also waits for a duration that exceeds the threshold, the interrupt controller 351 may attempt to migrate the interrupt again by sending another interrupt signal to another core. In some embodiments, the IWT register 352 may specify different waiting durations for a first migration and a second migration of a single interrupt. For instance, the second waiting duration may be shorter than the first duration or vice versa.

The software and/or circuitry may be used to log interrupt migration when migration occurs. This logged data may be monitored and used to adjust an interrupt wait threshold timeout and/or affinity to accommodate potential real-time performance of the SoC.

Figure 13:
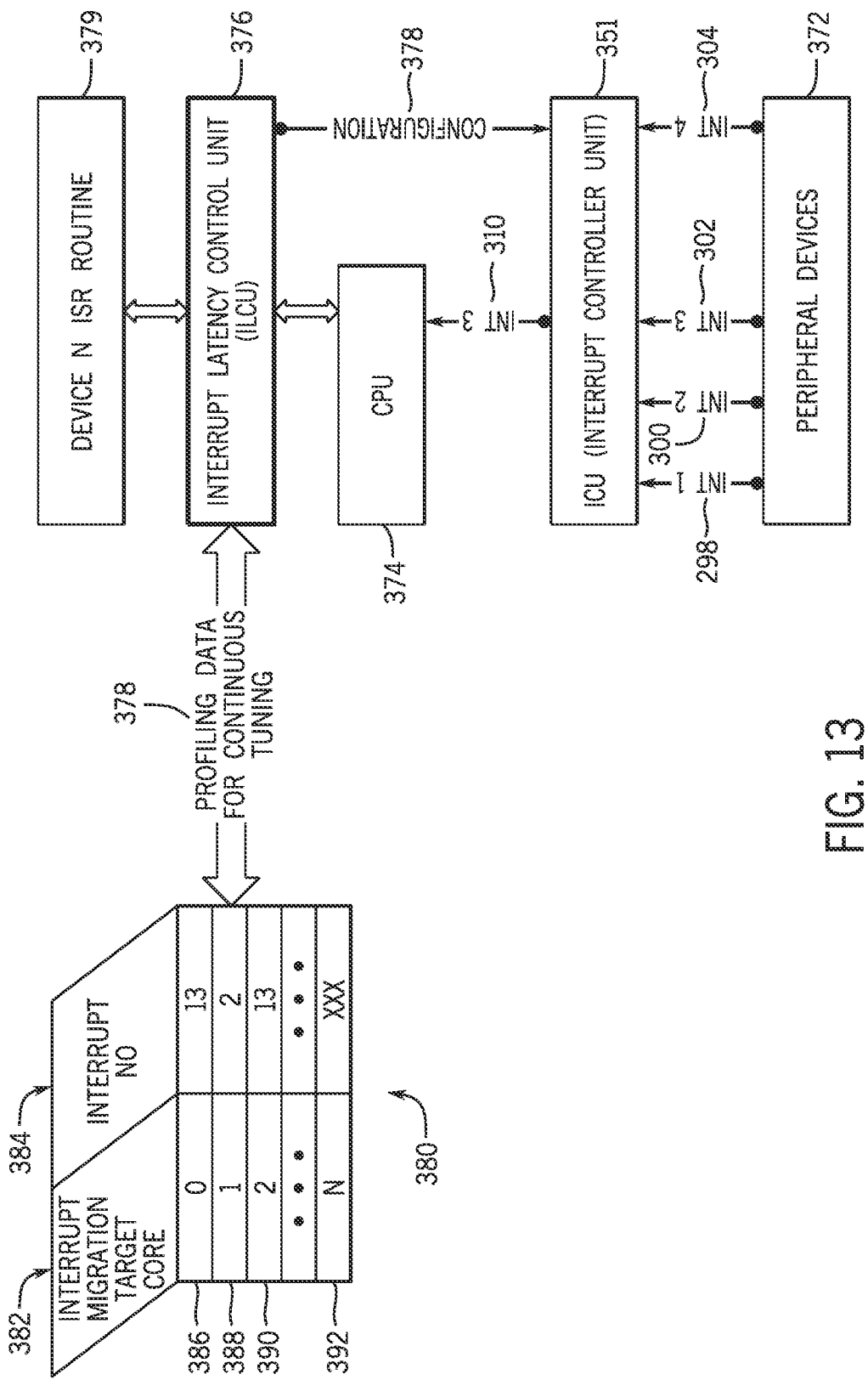
FIG. 13 is a system used to track migrations via an interrupt latency control unit, in accordance with an embodiment of the present disclosure.

FIG. 13 shows a block diagram of a system 370 that includes the interrupt controller 351 and peripheral devices 372 sending the interrupt requests 298, 300, 302, and 304 to the interrupt controller 351. The system 370 also includes a CPU 374 that includes the cores 306 and 308, among others. The system 370 further includes an interrupt latency control unit (ILCU) 376. The ILCU 376 may be implemented using software instructions, hardware circuitry, or a combination of both. The ILCU 376 may be used to log and monitor interrupt migrations to adjust an interrupt wait threshold duration and/or target cores for migrations. In other words, the ILCU 376 may be used to permanently move/change affinity of interrupts that have been frequently migrated to other cores for certain implementations/use cases. Using these techniques, the ILCU 376 enables the system 370 to resolve interrupt affinities and wait times more quickly and accurately than traditional mechanisms that may only track how long an interrupt has been seen by the CPU 374 without tracking how long the interrupt waits to enter a core of the CPU 374.

The ILCU 376 may store and monitor 378 data profiles for continuous tuning in how one or more ISRs 379 are executed to handle respective interrupts. The ILCU 376 may store the data about one or more (e.g., all) interrupts in data store 380. The data store 380 may be stored in a cache of the CPU 374 and/or in any suitable register/memory location in the system. The data store 380 may include a first parameter 382 and a second parameter 384 that are stored as a pair for each entry 386, 388, 390, and 392. Each entry indicates an interrupt migration while the first parameter 382 stores information about which core (e.g., using a first index number) is the target of the interrupt migration and the second parameter 384 indicates which interrupt (e.g., using a second index number) has been migrated. For example, entries 386 and 390 indicate migrations to cores 0 and 2 for an interrupt number 13. The entry 388 indicates a migration of interrupt 2 to core 1. If the ILCU 376 detects that an interrupt has been migrated multiple times (i.e., more occurrences than a threshold value such as 1, 2, 3, 4, 8, 16, etc.), the ILCU 376 may update the affinity of the interrupt to one of the cores used for repeated interrupt migration of the interrupt. For instance, if the entry 388 is part of more migrations than the threshold number of interrupt 2 to core 1, the ILCU 376 may cause the affinity of interrupt 2 to be changed to core 1.

In some embodiments, the data store 380 stores only successfully completed migrations. Additionally or alternatively, the data store 380 may include additional information. For instance, a third parameter may be stored related to success or failure of a migration. If more than a threshold number (e.g., 1, 2, 3, or more) of migrations fail to a core, the ILCU 376 may cause the target core of those failures to be removed from the IMTC register 354 and/or affinities for that interrupt. Additionally or alternatively, a fourth parameter may be included to indicate a total number of occurrences of the migration of a particular interrupt to a target core.

Using these techniques, the ILCU 376 may assign the affinity of an interrupt dynamically to extract efficient real time responses to an interrupt request. Furthermore, the ILCU 376 may be tweaked (e.g., change of threshold number) dynamically when the ILCU 376 is at least partially implemented in software. This tweaking of the ILCU 376 may differ between different systems/deployments of a same system depending upon the system configuration, a use case of the systems, and the needs of the device utilizing the system.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims. For instance, some embodiments of the processor/SoC disclosed herein may utilize a combination of the grouping mechanisms (e.g., membership groups, external event groups, and/or timing groups) to perform interrupt clustering.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

EXAMPLE EMBODIMENTS

EXAMPLE EMBODIMENT 1. A system comprising:
a plurality of processing cores; and
an interrupt controller, comprising:
an input terminal configured to receive an interrupt request;
an interrupt controller timer;
an output terminal configured to output an interrupt signal based on the interrupt request, wherein the interrupt signal is configured to cause a first processing core of the plurality of processing cores to service an interrupt corresponding to the interrupt signal; and
interface configuration and status circuitry configured to track a period of time that the interrupt signal is transmitted to the first processing core.

EXAMPLE EMBODIMENT 2. The system of example embodiment 1, wherein the interrupt controller comprises an interrupt wait threshold register that stores a wait threshold, and the interrupt controller is configured to compare the period of time to the wait threshold.

EXAMPLE EMBODIMENT 3. The system of example embodiment 2, wherein when the period of time exceeds the wait threshold, the interrupt controller outputs an additional interrupt signal to a second processing core of the plurality of processing cores, wherein the additional interrupt signal is configured to cause the second processing core to service the interrupt.

EXAMPLE EMBODIMENT 4. The system of example embodiment 3, wherein the interrupt controller comprises an interrupt migration target core register that indicates the second processing core as the target of the output of the additional interrupt signal as an interrupt migration from the first processing core.

EXAMPLE EMBODIMENT 5. The system of example embodiment 4, wherein the migration target core register specifies only the second processing core of the plurality of processing cores.

EXAMPLE EMBODIMENT 6. The system of example embodiment 4, wherein the migration target core register specifies a plurality of target processing cores of the plurality of processing cores, wherein the plurality of target processing cores comprises the second processing core of the plurality of processing cores.

EXAMPLE EMBODIMENT 7. The system of example embodiment 6, wherein the plurality of target processing cores of the plurality of target processing cores has a prioritized order.

EXAMPLE EMBODIMENT 8. The system of example embodiment 6, wherein the plurality of target processing cores of the plurality of target processing cores has a same priority.

EXAMPLE EMBODIMENT 9. The system of example embodiment 2, wherein the interrupt controller is configured to control at least one non-migratable interrupt that is not migratable between the plurality of processing cores.

EXAMPLE EMBODIMENT 10. The system of example embodiment 9, wherein the at least one non-migratable interrupt is not stored in the interrupt wait threshold register or is not stored in an interrupt migration target core register.

EXAMPLE EMBODIMENT 11. The system of example embodiment 1, comprising interrupt latency control that is configured to store a number of interrupt migrations for the interrupt.

EXAMPLE EMBODIMENT 12. The system of example embodiment 11, where the interrupt latency control is configured to adjust an affinity of the interrupt based on the number of interrupt migrations.

EXAMPLE EMBODIMENT 13. The system of example embodiment 11, where the interrupt latency control is configured to change an affinity of the interrupt based on the number of interrupt migrations exceeding a migrations threshold.

EXAMPLE EMBODIMENT 14. The system of example embodiment 11, wherein the interrupt latency control is configured to adjust a wait threshold before an interrupt migration occurs based on the number of interrupt migrations.

EXAMPLE EMBODIMENT 15. A method comprising:
receiving an interrupt request at an interrupt controller, wherein the interrupt request requests that a first interrupt signal to be transmitted to a core of a processor, wherein the first interrupt signal is configured to cause the core to service an interrupt;
determining, at the interrupt controller, that the interrupt has waited at the interrupt controller longer than a threshold duration stored in an interrupt wait threshold register for the interrupt;
determining, at the interrupt controller, a target migration core of the processor using an interrupt migration core register for the interrupt; and
transmitting, from the interrupt controller, a second interrupt signal to the target migration core of the processor, wherein the second interrupt signal is configured to cause the core to service the interrupt.

EXAMPLE EMBODIMENT 16. The method of example embodiment 15, wherein the interrupt waits at the interrupt controller due to the core being busy servicing a higher priority interrupt.

EXAMPLE EMBODIMENT 17. The method of example embodiment 15, wherein determining the target migration core comprises using the target migration core as one of a plurality of target migration cores stored in the interrupt migration core register.

EXAMPLE EMBODIMENT 18. The method of example embodiment 15, comprising:
using interrupt latency control circuitry, tracking a number of interrupt migrations of the interrupt over time; and
using the interrupt latency control circuitry, changing an affinity or wait threshold of the interrupt based on the number of migrations.

EXAMPLE EMBODIMENT 19. A system, comprising:
one or more peripheral devices configured to generate interrupt requests to cause respective interrupts to be serviced;
one or more processor cores configured to service the interrupts; and
a programmable interrupt controller configured to:
receive the interrupt requests;
track wait durations between arrival of the respective interrupt requests and the programmable interrupt controller transmission of respective interrupt requests to the one or more processor cores;
determine whether the wait durations exceed respective wait thresholds indicated in one or more interrupt wait threshold registers;
when the wait durations exceed the respective wait thresholds, determine a target core of the one or more processor cores for the respective interrupts with wait durations exceeding the respective wait thresholds; and
transmit respective interrupt signals with wait durations exceeding the respective wait thresholds to respective target cores to cause the respective interrupts to be serviced by the respective target cores.

EXAMPLE EMBODIMENT 20. The system of example embodiment 15, comprising interrupt latency control circuitry configured to track a number of interrupt migrations of the respective interrupts over time and change an affinity or wait threshold of one or more respective interrupts based on the number of migrations.

What is claimed is:

1. A system comprising:
a plurality of processing cores; and
an interrupt controller, comprising:
an input terminal configured to receive an interrupt request;
an interrupt controller timer;
an output terminal configured to output an interrupt signal based on the interrupt request, wherein the interrupt signal is configured to cause a first processing core of the plurality of processing cores to service an interrupt corresponding to the interrupt signal;
interface configuration and status circuitry configured to track a period of time that the interrupt signal is transmitted to the first processing core; and
an interrupt wait threshold register that stores a wait threshold, wherein the interrupt controller is configured to compare the period of time to the wait threshold and to output an additional interrupt signal to a second processing core of the plurality of processing cores when the period of time exceeds the wait threshold, and the additional interrupt signal is configured to cause the second processing core to service the interrupt.

2. The system of claim 1, wherein the interrupt controller comprises an interrupt migration target core register that indicates the second processing core as the target of the output of the additional interrupt signal as an interrupt migration from the first processing core.

3. The system of claim 2, wherein the interrupt migration target core register specifies only the second processing core of the plurality of processing cores.

4. The system of claim 2, wherein the interrupt migration target core register specifies a plurality of target processing cores of the plurality of processing cores, wherein the plurality of target processing cores comprises the second processing core of the plurality of processing cores.

5. The system of claim 4, wherein the plurality of target processing cores of the plurality of target processing cores has a prioritized order.

6. The system of claim 4, wherein the plurality of target processing cores of the plurality of target processing cores has a same priority.

7. The system of claim 1, wherein the interrupt controller is configured to control at least one non-migratable interrupt that is not migratable between the plurality of processing cores.

8. The system of claim 7, wherein the at least one non-migratable interrupt is not stored in the interrupt wait threshold register or is not stored in an interrupt migration target core register.

9. The system of claim 1, comprising interrupt latency control that is configured to store a number of interrupt migrations for the interrupt.

10. The system of claim 9, where the interrupt latency control is configured to adjust an affinity of the interrupt based on the number of interrupt migrations.

11. The system of claim 9, where the interrupt latency control is configured to change an affinity of the interrupt based on the number of interrupt migrations exceeding a migrations threshold.

12. The system of claim 9, wherein the interrupt latency control is configured to adjust the wait threshold before an interrupt migration occurs based on the number of interrupt migrations.

13. A method comprising:
receiving an interrupt request at an interrupt controller, wherein the interrupt request requests that a first interrupt signal be transmitted to a core of a processor, wherein the first interrupt signal is configured to cause the core to service an interrupt;
determining, at the interrupt controller, that the interrupt has waited at the interrupt controller longer than a threshold duration stored in an interrupt wait threshold register for the interrupt;
determining, at the interrupt controller, a target migration core of the processor using an interrupt migration core register for the interrupt, wherein determining the target migration core comprises using the target migration core as one of a plurality of target migration cores stored in the interrupt migration core register; and
transmitting, from the interrupt controller, a second interrupt signal to the target migration core of the processor, wherein the second interrupt signal is configured to cause the core to service the interrupt.

14. The method of claim 13, wherein the interrupt waits at the interrupt controller due to the core being busy servicing a higher priority interrupt.

15. The method of claim 13, comprising:
using interrupt latency control circuitry, tracking a number of interrupt migrations of the interrupt over time; and
using the interrupt latency control circuitry, changing an affinity or wait threshold of the interrupt based on the number of interrupt migrations.

16. A system, comprising:
one or more peripheral devices configured to generate interrupt requests to cause respective interrupts to be serviced;
one or more processor cores configured to service the interrupts; and
a programmable interrupt controller configured to:
receive the interrupt requests;
track wait durations between arrival of the respective interrupt requests and the programmable interrupt controller transmitting respective interrupt requests to the one or more processor cores;
determine whether the wait durations exceed respective wait thresholds indicated in one or more interrupt wait threshold registers;
when the wait durations exceed the respective wait thresholds, determine a target core of the one or more processor cores for the respective interrupts with wait durations exceeding the respective wait thresholds; and
transmit respective interrupt signals with wait durations exceeding the respective wait thresholds to respective target cores to cause the respective interrupts to be serviced by the respective target cores; and
interrupt latency control circuitry configured to track a number of interrupt migrations of the respective interrupts over time and change an affinity or wait threshold of one or more respective interrupts based on the number of interrupt migrations.

17. The system of claim 16, wherein the programmable interrupt controller is configured to store the wait thresholds in wait threshold registers.

18. The system of claim 16, wherein interrupt latency control is configured to store the number of interrupt migrations for each respective interrupt.

19. The system of claim 18, where the interrupt latency control is configured to adjust the affinity of the respective interrupt based on the number of respective interrupt migrations.

* * * * *